May 31, 1966 R. W. HILL 3,254,170
HIGH PRESSURE FLOAT ACTUATED SWITCH
Filed July 5, 1963
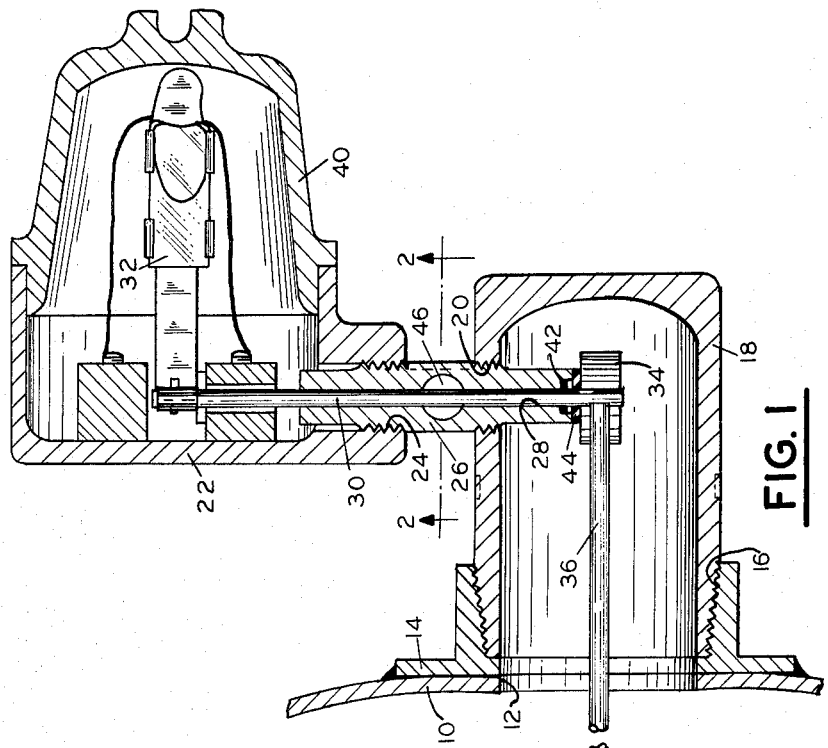
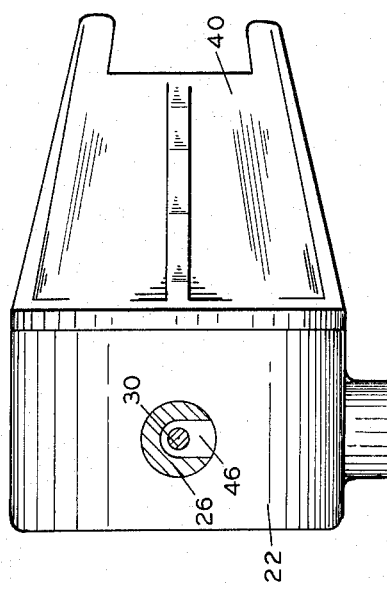
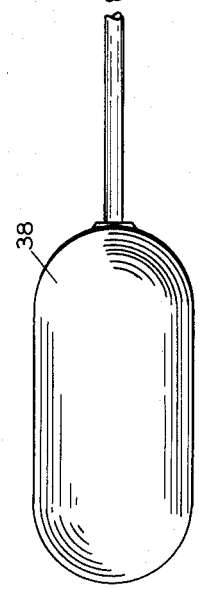
INVENTOR.
RALPH W. HILL
BY
*Head & Johnson*
ATTORNEYS

United States Patent Office 3,254,170
Patented May 31, 1966

3,254,170
HIGH PRESSURE FLOAT ACTUATED SWITCH
Ralph W. Hill, Tulsa, Okla., assignor to Major Engineering Company, Tulsa, Okla., a corporation of Oklahoma
Filed July 5, 1963, Ser. No. 292,897
2 Claims. (Cl. 200—84)

The invention relates to a float switch. More particularly, the invention relates to a float switch adaptable for utilization on fluid containing vessels having high pressures. Still more particularly, the invention relates to a novel type of float switch for use on high pressure vessels including means for preventing the communication of the liquid contained in the pressured vessel from entering the switch housing portion of the float switch. Many vessels utilized in the petroleum and chemical industry are pressurized. A problem arises in attempting to detect the level of liquids in such vessels in that it is difficult to provide a float switch having completely dependable seal means to prevent the passage of liquids into the switch containing compartments. Much of the liquids for which float switches are utilized are very caustic and corrosive to electrical equipment. Liquids such as crude petroleum or salt water are particularly deleterious materials in contact with any type of electrical equipment.

In addition, when a float switch is utilized to detect the level of a flammable liquid, as frequently occurs in the petroleum and chemical industry, leakage of fluid into the switch compartment can result in an explosion set off by an accidental spark from the switching device or devices. Another problem encountered in detecting the level of liquid in a pressurized vessel is that any leakage from the vessel to the switch compartment may raise the pressure in the switch compartment to that in the vessel, resulting in the rupture of the switch housing.

It is therefore an object of this invention to provide a float switch capable of withstanding high pressures with a minimum risk of explosion or switch housing failure.

Another object of this invention is to provide a high pressure float switch including a means of preventing the communication of liquid from the vessel in which the liquid is being measured into the switch containing portions of the device.

These and other objects and a better understanding of the invention may be had by referring to the following description and claims taken in conjunction with the attached drawings in which:

FIGURE 1 is a cross-sectional view of the float switch of this invention mounted on the side of a vessel.

FIGURE 2 is a cross-sectional view taken along a line 2—2 of FIGURE 1.

This invention may be described as a high pressure float switch. More particularly, but not by way of limitation, the invention may be described as a float switch for detecting the level of liquid in a liquid container comprising a hollow float support closed at one end and including means at the opposite open end for affixing to said liquid containing vessel, said float support having a shaft opening in one side thereof, a shaft housing sealably received at the first end by shaft opening in said float support, said shaft housing having a bore therethrough, a closed, hollow switch housing having a shaft opening in one side thereof, said shaft opening sealably receiving the second end of said shaft housing, a pivot shaft rotatably supported in said shaft housing having one end terminating in said float support and the opposite end terminating in said switch housing, a float rod affixed at the first end to said end of said pivot rod extending within said float support, the second end of said float rod extending within said liquid container, a float affixed to the second end of said float rod, and a switch means in said switch housing mounted for actuation by the rotation of said pivot shaft as said pivot shaft is rotated by the displacement of said float, said shaft housing having a downwardly extending opening therein intermediate the length thereof and intermediate said float support and said switch housing, said opening exposing said pivot shaft in the full circumference thereof.

Referring now to the drawings, and first to FIGURE 1 the float switch of this invention is shown in cross-section and as affixed to a liquid containing vessel 10. The vessel is only partially shown having an opening 12 in the wall thereof. The float switch of this invention may be affixed to the vessel in a variety of ways. A method shown includes the use of a flange 14 which is welded to the vessel 10, the flange 14 having a threaded opening 16 therein.

A major element of the float switch of this invention includes a hollow float support member 18 which is threaded at the open end thereof to the flange 14. A shaft opening 20 is provided in one side of the float support member 18.

A second major element of the invention in a switch housing 22 which is a closed container having a shaft opening 24 in one side thereof.

Extending between the switch housing 22 and the float support member 18 is a shaft housing 26 having an axial bore 28 therethrough. The shaft housing 26 is sealable received by the shaft opening 24 in the switch housing 22 and the shaft opening 20 in the float support member 18.

Rotatably supported in the bore 28 of the shaft housing 26 is a pivot rod 30 which extends at one end within the switch housing 22 and at the other end within the float support member 18. Affixed to the end within switch housing 22 is a switch means 32 which is actuated by rotation of the pivot rod 30. The switch means 32 may be a variety of switches such as micro-switch or mercury switch. Such switch means may be actuated by the pivotation of a support to which this switch is attached, by cam action or by a variety of other means.

Affixed to the end of the pivot rod 30 within the float support member 18 is a collar 34. Extending from collar 34 is a float rod 36 which extends through opening 12 into the interior of the vessel 10. Float rod 36 screws into collar 34 and bears against a flattened portion of pivot rod 30, preventing relative movement of float rod 36 and pivot rod 30. Within the vessel 10 is a float 38 secured to the end of float rod 36.

The switch housing 22 may be of a variety of configurations. The configurations shown include the provisions of a removable closure member 40 but it is to be understood that other configurations are equally applicable to the principles of this invention.

The pivot rod 30 is rotatably but sealably supported in the bore 28 of the shaft housing 26. Preferably a dry lubricant is provided to insure free pivotation of rod 30. To further assure a pressure seal an O-ring or other gasket means 42 is provided to seal the shaft 28 with the shaft housing 26 to prevent the passage of fluid therethrough. In addition, the provision of a thrust washer 44 between the collar 34 and the end of the shaft housing 26 provides further seal means as well as improved pivotation of shaft 30.

A very important provision of this invention is means of preventing fluid within vessel 10 from seeping into the interior of switch housing 22. In order for the float switch of this invention to function properly it is imperative that the rod 30 be freely pivotable. This means that only limited packing and seal pressure may be applied to seal it against fluid leakage. When the packing or rod wears, the opportunity exists for fluid to be communicated along the pivot rod 30 and thereby enter the switch housing 40. As has been previously indicated many of the types of fluid most commonly encountered in the petroleum and chemical industries are very deleterious to electrical equipment. To prevent the possibility of fluid passage along pivot rod 30 a downwardly extending opening 46 is provided intermediate the length of shaft housing 26, and between the switch housing 22 and the float support member 18.

The opening 46 can best be seen in the cross-sectional view of FIGURE 2. The opening 46 preferably extends around the full circumference of pivot rod 30 so that any fluid traveling along the rod 30 encountering opening 46 will drop out and thereby will not be communicated into the switch housing 40.

The float switch of this invention has been described as it is applied directly to the vessel 10 in which the height of the liquid to be measured is contained. The invention is equally applicable when the vessel 10 is a small vessel connected by pipes to the larger liquid containing vessel.

Although this invention has been described in a certain degree of particularities, it is manifest that many changes may be made in the details of construction and the arrangement of components without departing from the spirit and scope of this disclosure.

What is claimed:

1. A float actuated switch for detecting the level of liquid in a liquid containing vessel comprising a hollow float support closed at one end and including means at the opposite open end for affixing to said liquid containing vessel, said float support having an opening in one side thereof;

a rigid shaft housing sealably received at a first end to said opening in said float support, said housing having an axial bore therethrough, and a diversion conduit therein intermediate the length of said housing, said conduit intersecting with said bore;

an enclosed hollow switch housing spaced from said float support having an opening in one side thereof to receive the second end of said shaft housing and be supported thereby to said float support such that said diversion conduit is between said support and said housing;

a pivot shaft rotatably supported in said shaft housing bore having one end terminating in said float support and the opposite end terminating in said switch housing;

a float rod affixed at its first end to said one end of said pivot shaft extending within said float support, the second end of said float rod extending within said liquid containing vessel;

a float affixed to the second end of said float rod;

a switch means in said switch housing mounted for actuation by the rotation of said pivot shaft as said pivot shaft is rotated by the displacement of said float;

seal means positionable around said shaft adjacent its said one end terminating in said float support; and whereby any leakage around said pivot shaft past said seal from said vessel is diverted from said switch housing through said diversion opening.

2. A float actuated switch as described in claim 1 wherein said conduit in said float support housing which intersects said bore transversely extends across said housing.

References Cited by the Examiner
UNITED STATES PATENTS

| 2,203,766 | 6/1940 | Baer et al. | |
| 2,877,318 | 3/1959 | Culley | 200—84 |
| 2,878,335 | 3/1959 | Vitu | 200—84 |
| 2,907,845 | 9/1959 | Culley | 200—84 |

BERNARD A. GILHEANY, *Primary Examiner.*

ROBERT K. SCHAEFER, *Examiner.*

H. A. LEWITTER, *Assistant Examiner.*